L. E. NELSON.
ADJUSTABLE LAMP SUPPORT.
APPLICATION FILED MAY 27, 1915.
1,169,345.
Patented Jan. 25, 1916.
2 SHEETS—SHEET 2.
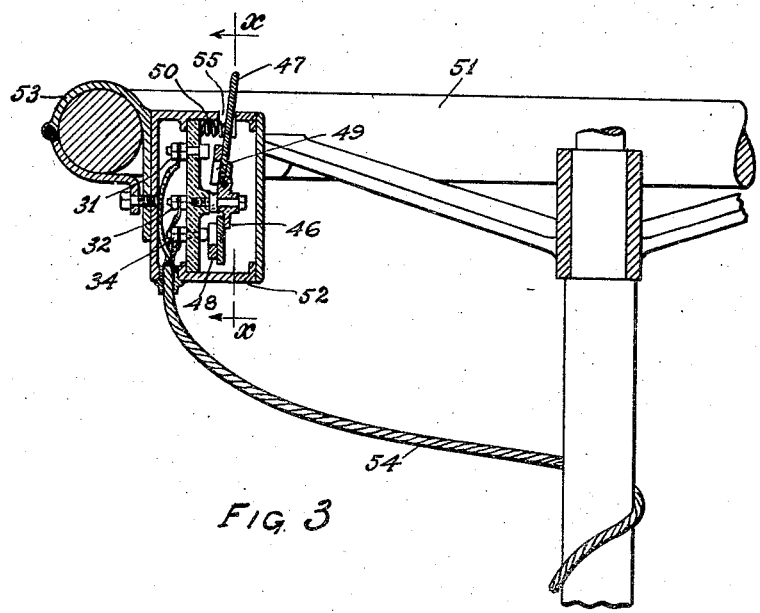
FIG. 3
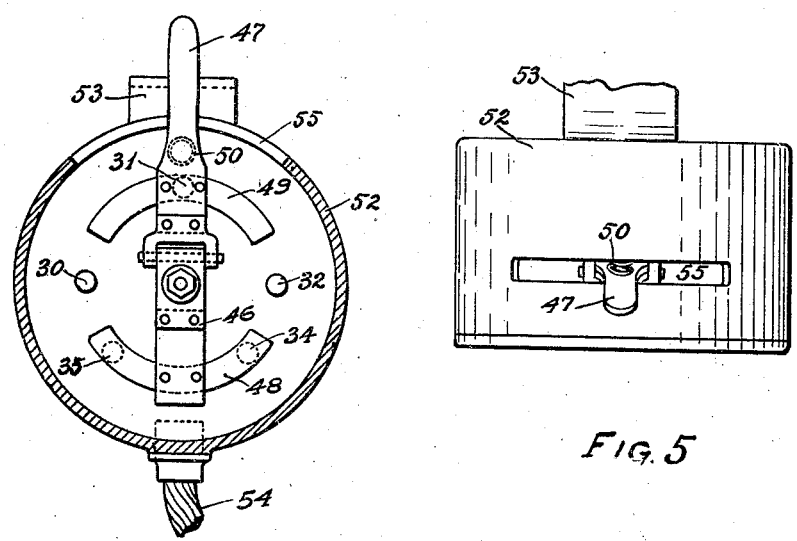
FIG. 4
FIG. 5
WITNESSES:
O. Johnson
Geo Blair
INVENTOR
Lyman E. Nelson
BY
C. D. Hankins
ATTORNEY

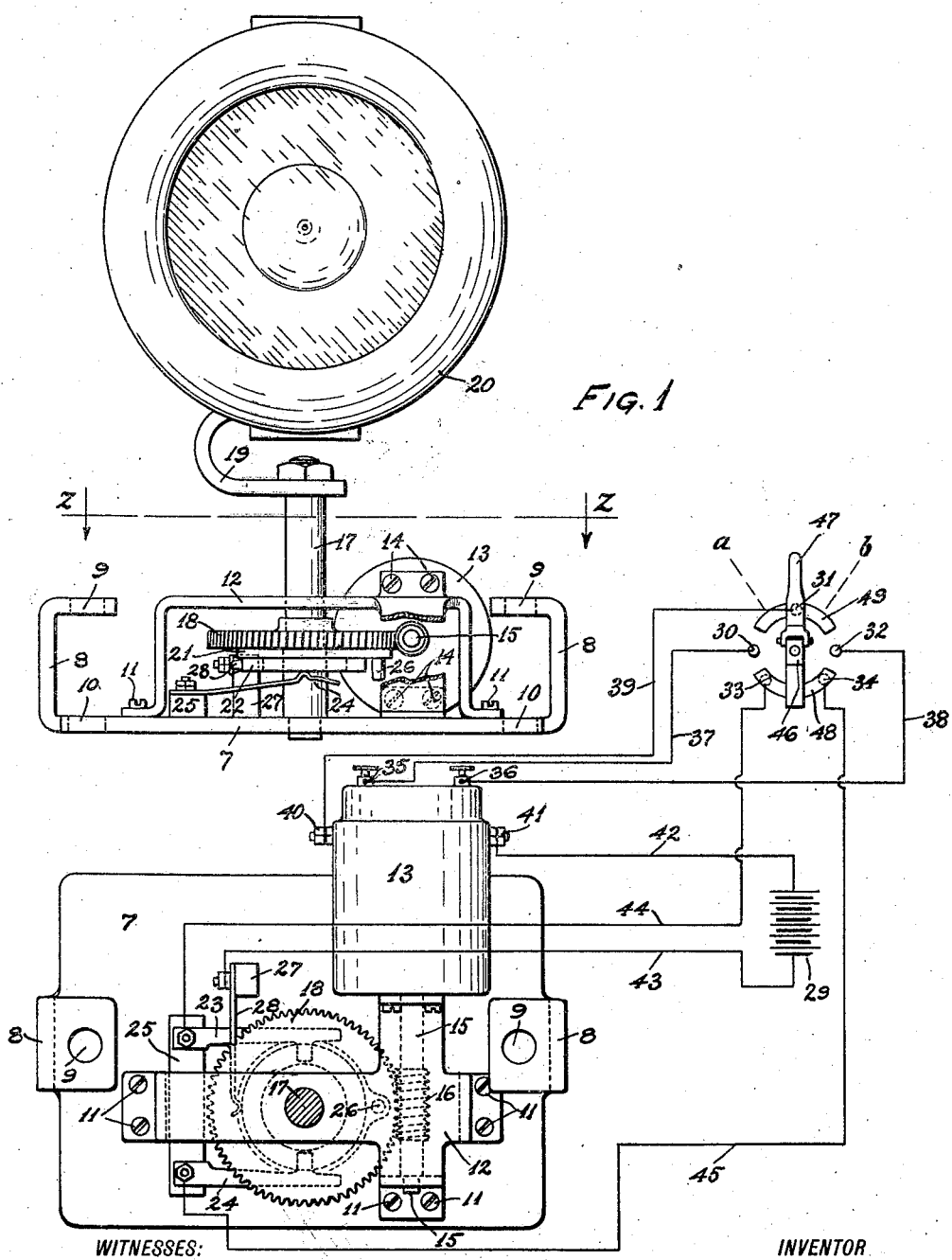

UNITED STATES PATENT OFFICE.

LYMAN E. NELSON, OF SEATTLE, WASHINGTON.

ADJUSTABLE LAMP-SUPPORT.

1,169,345.   Specification of Letters Patent.   Patented Jan. 25, 1916.

Application filed May 27, 1915. Serial No. 30,830.

*To all whom it may concern:*

Be it known that I, LYMAN E. NELSON, citizen of the United States, residing at Seattle, in the county of King and State of Washington, have invented a certain new and useful Improvement in Adjustable Lamp-Supports, of which the following is a specification.

My invention relates to improvements in adjustable lamp-supports, and the object of my invention is to provide a lamp-support which shall embody an electric motor and associated mechanism that may be actuated at will to turn a lamp and its reflector to direct its rays of light toward any desired point of a semi-circle in response to the manipulation of an electric switch connected with the electric circuit within which said motor is included; and a further object of my improvements is to provide such an adjustable lamp-support that shall be especially adapted to be attached to an automobile to support an automobile lamp and be actuated, in response to the manipulation of an electric switch that is attached to the rim of the steering wheel of said automobile, to turn said lamp and its reflector to a position that will direct its rays of light to any desired angle within 45 degrees on either side of the course traveled by such automobile. I attain these objects by devices illustrated by the accompanying drawings wherein—

Figure 1 is a view in front elevation of an adjustable lamp-support embodying parts of my invention without an inclosing case; Fig. 2 is a plan view of parts of the same associated with electric circuits, an electric switch and a source of electricity; Fig. 3 is a view in vertical mid-section of an electric switch embodied in my invention as attached to a steering wheel of an automobile; Fig. 4 is an enlarged view of said switch in vertical section on broken line $x, x$ of Fig. 3; and Fig. 5 is a plan view of the structure of Fig. 4.

Referring to the drawings, throughout which like reference numerals indicate like parts, a base-plate 7 is provided on its opposite ends with integral lugs 8 which are bent vertically upward for a distance, then inwardly on a horizontal plane, as shown in Fig. 1, and each of such inwardly extended portions of such lugs 8 is provided with a hole, as holes 9, which holes 9 are disposed directly over holes 10 formed in said base-plate 7 whereby said base-plate may be disposed on two studs of a well known form of lamp-holder, not shown, which is associated with some forms of automobiles, which studs are adapted to fit within said holes 9 and 10 to support said base-plate 7.

Secured by screws 11 to the top surface of the base-plate 7 are the legs of a bracket 12 to one leg of which bracket 12 is fastened by screws 14 an electric motor 13 whose shaft 15 is extended through said leg to and through an oppositely disposed leg of said bracket 12 as indicated by dotted lines in Fig. 2, and on such extended portion of said shaft 15 is a worm-screw 16. Rotatably disposed in bearings formed in said bracket 12 and base-plate 7 is a vertical shaft 17 upon which is fastened a worm gearwheel 18 disposed to engage with the thread of the worm-screw 16 whereby said shaft 17 may be rotated in response to a rotation of the motor shaft 15. Upon the top end portion of the shaft 17 is fastened a bracket 19 upon which is mounted an automobile lamp 20 of well known form.

Secured to the underside of the worm gearwheel 18 is a disk 21, of material that is a non-conductor of electricity, to which disk 21 is secured a metal ring 22 in a position concentric with the shaft 17, said ring 22 being thus insulated from said shaft 17 and said gearwheel 18. Disposed to engage with the underside of said ring 22, at opposite points thereof, are electrical contact springs 23 and 24 respectively, which are mounted on a block 25, of insulating material, which block 25 is fastened to the top of the base-plate 7.

Fixed in the insulating disk 21 to project downwardly therefrom, adjacent to the periphery of the ring 22, is an insulated stud 26 which by its position is adapted to engage with the projecting end of one of the contact springs 23 and 24 to disengage it from contact with the metal ring 22 in response to a rotary movement of the worm gearwheel 18 in either direction for a distance of forty-five degrees from the position indicated by dotted lines in Fig. 2.

Mounted on the base-plate 7 is a block 27 of insulating material to which is secured an electrical contact spring 26 disposed to engage with the periphery of the metal ring 22 more clearly indicated by dotted lines in Fig. 2.

A battery 29, or other source of electricity, serves to supply electric current for operating the motor 13 whose operation is controlled by an electric switch having five contact-points 30, 31, 32, 33 and 34, the contact-points 30 and 32 being connected respectively with armature terminals 35 and 36 of the motor 13 by conducting wires 37 and 38 respectively, and the contact-point 31 being connected by a conductor 39 with one terminal 40 of the field-winding of the motor 13 whose other terminal 41 is connected by conductor 42 with one terminal of the battery 29 whose other terminal is connected by conductor 43 with contact-spring 28, while contact-springs 23 and 24 are connected respectively to contact-points 35 and 34 by conductors 44 and 45.

Associated with the contact-points 30, 31, 32, 33 and 34 is a pivotally supported switch-arm 46 of insulating material to which is articulated a lever 47, and to the underside of said switch-arm 46 and said lever 47 is secured insulated contact-springs 48 and 49, respectively, whereby, when the lever 47 is moved from its position shown in Fig. 2 in a contra-clockwise direction to a position indicated by broken line *a* then the contact-spring 48 will form a path for current between contact-points 34 and 32 while the contact spring 49 will form a path for current between 30 and 31; but if the lever 47 be turned in a clockwise direction to the position indicated by the broken line *b* then said contact-spring 48 will form a path for current between contact-points 30 and 35 while the contact-spring 49 will form a path for current between contact-points 31 and 32; normally however, the lever 47 is in a position (as indicated in Fig. 3) whereby the contact-spring 49 can engage with the contact-points 30, 31 and 32 only when said lever 47 is pressed inwardly against the force of a compression spring, as for instance, the compression spring 50 shown in Fig. 3, whereby an accidental clockwise or contra-clockwise movement only of the lever 47 would make no effective change in the circuits of the apparatus. Thus, if it be desired to turn the light rays of lamp 20 from a direction straight ahead to one side for a distance of forty-five degrees then the operator will move the lever 47 to the position indicated by the broken line *a* of Fig. 2, and then depress it to cause the contact spring 49 to engage with the contact points 30 and 31 whereupon current from the battery 29 will traverse conductor 42 to and through the field windings of the motor 13, thence through conductor 39 to contact-point 31, thence through contact-spring 49 to contact-point 30, thence through conductor 37 to and through the armature winding of the motor 13, thence through conductor 38 to the contact point 32, thence through contact spring 48 to the contact-point 34, thence through conductor 45 to and through the contact-spring 24 to the metal ring 22, thence to the contact-spring 28 and thence through conductor 43 to the other terminal of the battery 29, thus to actuate the motor 13 to turn the shaft 15 to cause the worm-screw 16 to revolve the worm-gear 18 and shaft 17 to turn the lamp 20 until its rays of light are turned sidewise for a distance of forty-five degrees whereupon the insulated stud 26 will engage with one of the contact-springs 23 or 24, according to the direction of rotation of the motor 13, to force such contact-spring from its contact with the metal ring 22 thus breaking the circuit therethrough and stopping the motor. If however, it be desired to hold the lamp's light rays at any particular angle within said distance of forty five degrees then when the lamp in its movement reaches such angle the operator will release the lever 47 which will then be actuated by the compression spring 50 to disengage the contact-spring 49 from the contact-points upon which it rests to stop the motor 13 thus to hold the lamp 20 at such desired angle.

In Fig. 3 I have shown one plan of disposing the motor-controlling switch of Fig. 2 in association with the steering wheel 51 of an automobile to which my invention is applied, which switch is secured in an inclosing case 52 so that its lever 47 projects upwardly through a slot 55 in the top portion of said case 52 to adapt it to be moved sidewise to open and close the motor circuit and to be moved edgewise to change the polarity of the current in such circuit. The case 52 is secured to the rim of the steering wheel 51 in any desired circumferential position thereon by a clamp 53 in an obvious manner and the electrical conductors 37, 38, 39, 44 and 45 (shown in Fig. 2) are formed into a cable 54, as shown in Fig. 3, which may be extended to the motor 13.

Figs. 4 and 5 are enlarged views of the case 52 indicating the relative positions of the chief operative parts of the switch contained therein.

Manifestly, my adjustable lamp support may be employed in connection with lamps other than automobile lamps, as, for instance, with lamps for lighting docks, freight houses and railroad signal lamps; but when it is embodied in an automobile in the manner hereinbefore described, a lamp may be moved to direct its light toward any point within an angular distance of forty five degrees on either side of the course of travel of such automobile by the manipulation of the lever 47 in an obvious manner.

If it be desired to limit the rotary movement of the lamp at different times to the angular distance of a particular portion of a circle then the stud 26 may be adapted to be adjustably changed in its angular position on the worm gearwheel 18 with relation to the angular position of the lamp 20 and if it be desired to make no limit to such rotary movement of said lamp 20, then said stud 26 may be wholly removed, in which case the motor 13 may be stopped when the lamp 20 reaches a desired angular point by releasing the lever 47.

Obviously, changes may be made in the forms, dimensions and arrangement of parts of my invention without departing from the spirit thereof.

What I claim is:

1. In an adjustable lamp-support of the class described, the combination with a base-plate, of a shaft associated with said base-plate and disposed vertically to be rotatable; a lamp secured to the upper end of said shaft; a worm gearwheel securely mounted on said shaft concentrically therewith; an electrically insulated metal ring associated with said shaft and said worm gearwheel in a position concentric therewith; an electric motor whose shaft is provided with a worm screw and which is mounted on said base-plate in a position so that said worm-screw engages with said worm gear-wheel; two contact-springs secured to and insulated from said base-plate and disposed to engage with one side surface of said insulated metal ring; an insulated stud associated with said worm gear-wheel and adapted to engage with each of said contact-springs to force it from engagement with said insulated ring in response to a rotation of said worm gear-wheel; another contact-spring secured to and insulated from said base-plate and disposed to engage with said insulated metal ring; a source of electricity; an electric pole-changing switch; and electric conducting circuits disposed to connect all of said contact-springs, said electric motor, said pole-changing switch and said source of electricity.

2. An adjustable lamp-support which embodies a base-plate; a vertically disposed shaft rotatably mounted on said base-plate; a lamp secured to the upper end of said shaft; an electric motor mounted on said base-plate and adapted to rotate said shaft; a source of electricity; a combined circuit breaking and pole-changing switch; electric circuits connecting said switch, said motor and said source of electricity; and means associated with said shaft for opening and closing one of said circuits in response to a rotation of said shaft.

3. An adjustable lamp-support which embodies an electric motor and an electric switch, said switch comprising five contact points, a pivoted switch-arm, a lever articulated with said switch-arm, an insulated contact-spring secured to said switch-arm, an insulated contact-spring secured to said lever, said contact-points being disposed in the circular path of said contact-springs and elastic means for normally maintaining said lever in such position as will prevent its attached contact-spring from engaging with any of said contact-points.

In witness whereof, I hereunto subscribe my name this 18th day of May, A. D., 1915.

LYMAN E. NELSON.

Witnesses:
 H. A. MORRISON,
 A. HASKINS.